United States Patent [19]

Haws

[11] 3,881,253

[45] May 6, 1975

[54] INSTA-PLOTTER APPARATUS FOR PLOTTING VISUAL AIRCRAFT POSITION USING RADIO INFORMATION

[76] Inventor: Robert E. Haws, 714 Placer Dr., Woodland, Calif. 95695

[22] Filed: Feb. 19, 1974

[21] Appl. No.: 443,686

[52] U.S. Cl.................. 33/1 MP; 33/75; 33/76 VA
[51] Int. Cl............................................. B43l 7/00
[58] Field of Search....... 33/27 C, 75, 76 R, 76 VA, 33/1 MP, 1 SD; 33/26, 1 N

[56] References Cited
UNITED STATES PATENTS

| | | | |
|---|---|---|---|
| 1,327,154 | 1/1920 | Golden | 33/26 |
| 2,104,515 | 1/1938 | Golden | 33/27 C |
| 2,343,883 | 3/1944 | Catlett | 33/1 N |
| 2,542,537 | 2/1951 | Klemm | 33/27 C |
| 2,933,827 | 4/1960 | Alberts | 33/76 |
| 3,187,434 | 6/1965 | Casagrande | 33/1 MP |
| 3,387,372 | 6/1968 | Sabadishin | 33/1 MP |
| 3,393,457 | 7/1968 | Freda | 33/76 |

FOREIGN PATENTS OR APPLICATIONS

| | | | |
|---|---|---|---|
| 429,651 | 6/1935 | United Kingdom | 33/76 V |
| 108,009 | 7/1917 | United Kingdom | 33/75 R |

Primary Examiner—Harry N. Haroian

[57] ABSTRACT

The apparatus includes two plastic transparent boards hingedly secured together and two like plotter devices. Each device is detachably securable to a board. Each device employs an elongated flat transparent strip with a longitudinal slot having a nautical miles scale on one side and a statute miles scale on the other side. A course structure at one end of the strip has a visible fine bearing degree scale increments, a visible radial course bearing degree scale and a visible reciprocal course bearing degree scale. Means detachably secure each device independently to a board.

4 Claims, 4 Drawing Figures

3,881,253

INSTA-PLOTTER APPARATUS FOR PLOTTING VISUAL AIRCRAFT POSITION USING RADIO INFORMATION

SUMMARY OF THE INVENTION

The purpose of this invention is to provide a quick, accurate method of locating the position of the aircraft on the aeronautical chart using VOR radial bearing information to prevent a pilot from becoming confused or doubtful of his present visual aircraft position.

The complete position problem may be worked with one hand, leaving the other hand free to fly the airplane.

The apparatus used in the invention employs two like plotter devices and a chart holder using two transparent boards hingedly secured together. The devices have suitably calibrated slots and means for locating each device detachably on the holder with the chart in position whereby two VOR station cross bearings can be located and the visual position of the aircraft is determined by the point of intersection of the slots.

A more detailed description and explanation of this invention is set forth below.

DETAILED DESCRIPTION OF PREFERRED EMBODIMENTS

Figure 1:
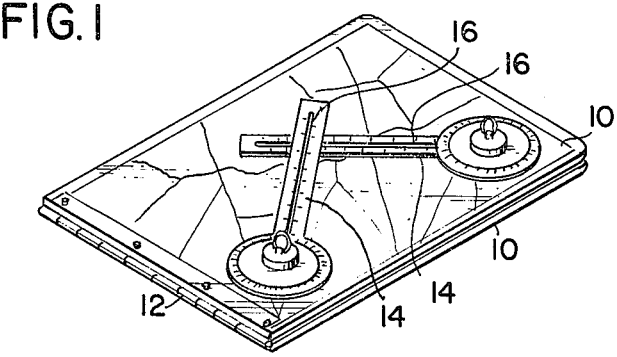
FIG. 1 is a perspective view of my apparatus.
Figure 2:
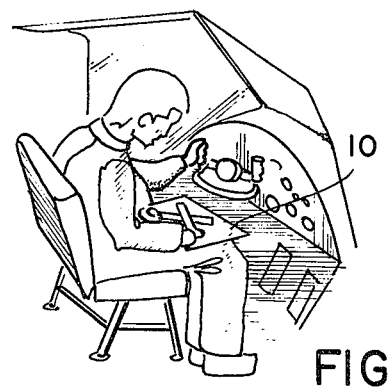
FIG. 2 shows my apparatus in use.
Figure 3:
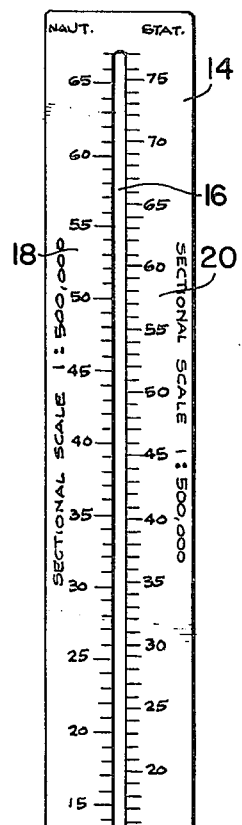
FIG. 3 is a plan view of one plotter device used in my apparatus.
Figure 4:
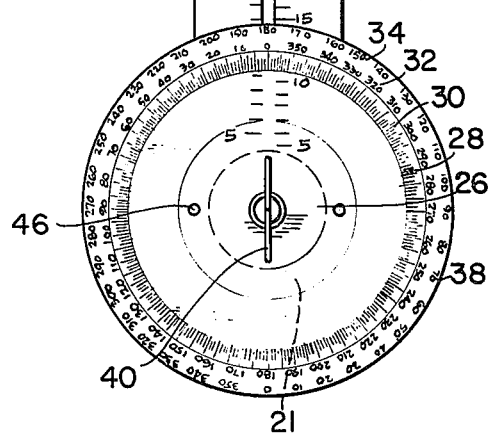
FIG. 4 is a side view of the device of FIG. 3.
Figure 4:
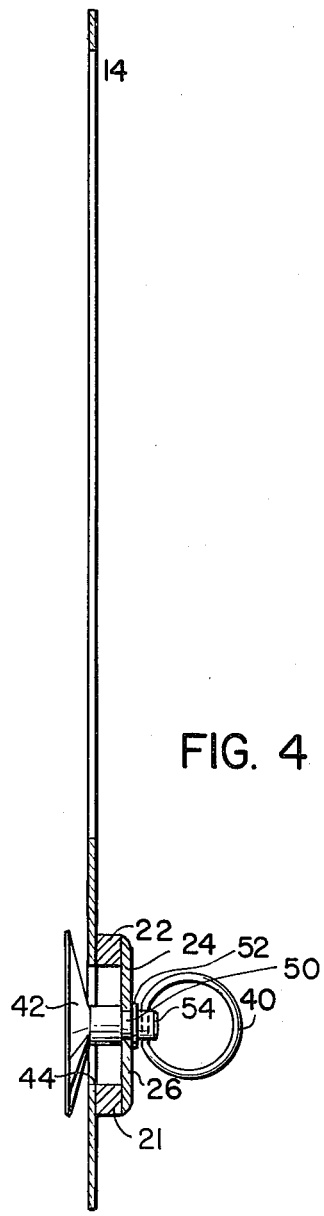

Referring now to FIGS. 1-4, two like flat transparent plastic boards 10 are secured together at one set of ends by piano hinge 12 using four aluminum rivets. Each board typically can be 15½ inches long, 10½ inches wide and ⅛ inch thick with rounded corner ends.

Two like plotter devices are used with the board. Each device employs an elongated strip 14 having an elongated longitudinally extending slot 16. A scale 18 to the left of the slot is calibrated in nautical miles. A scale 20 to the right of the slot is calibrated in statute miles. Typically, the slot is ⅛ inch wide and 7 9/16 inches long, etched or stamped with a black border on the bottom side of the slot.

Each device also carries a flat ring shaped course structure.

The course structure and strip are one piece of plastic material.

The course structure has an outside diameter 38 of 3¾ inches; the inside diameter 44 is 1¼ inches.

A clear plastic doughnut 21 typically ¼ inch thick with an outside diameter of 1 5/8 inches 22 and an inner diameter of 1¼ inches 24 is centered over the top of the course structure and secured by two countersunk fine thread screws 46.

The doughnut 21 is surmounted by a clear flat plastic cap 26 ⅛ inch thick having the same outside diameter of the doughnut 22.

A bushing 50 extends through the center of cap 26. The bushing is held at the top end of the cap by leaf spring tension washer 52, locknut 54 and lifting ring 40.

The other end of the bushing supports a threaded screw suction cup 42 which extends outward through the course structure inside diameter circle one and ¼ inches opening 44.

Etched or stamped on the bottom side of the course structure is a 2 13/16 inches diameter black circle alignment ring 28 centered concentrically around the course structure.

Ring 28 has fine bearing degree increments 30 which are marked off every 1° increments, with 5° marks longer than the 1° marks and with 10° marks longer than the 5° marks for easy identification.

The radial course bearing degree members 32 are etched or stamped on the bottom side of the plotter directly around the 10° long fine alignment marks 30 counter clockwise with 0° numbers in line with the center of slot 16.

The reciprocal course bearing degree numbers 34 are etched or stamped on the bottom side of the plotter around the outside of the radial course bearing degree numbers 32 counter clockwise with the one hundred and eighty degree number in line with the center of slot 16.

To operate the apparatus, the following steps are to be followed:

1. Place sectional aeronautical chart area being flown between the hinged plastic boards with hinge closed, locks chart secure in plotter board.

2. Place one plotter black circle alignment ring directly over the selected VOR compass rose blue circle on the chart, push down, locking the suction cup over center of the VOR station.

3. Rotate this plotter until the radial bearing degrees (FROM) the VOR station is indexed directly over the magnetic north line of the VOR station.

4. Using the other plotter repeat steps 2 and 3 for the second VOR station cross bearing.

5. Where the two plotter slots intersect each other, is the present visual position of the airplane on the chart, the DME distance in statue or nautical miles to VOR station.

6. To remove the plotters from the board use lifting rings to break the hold of the suction cups.

It is not necessary to draw lines on the board, on course or off course, but if desired a grease pencil can be used where the two slots intersect to mark course plots.

Simple method, the radial bearing "FROM" VOR station is always indexed directly over the VOR compass rose magnetic north line. Never necessary to read degree numbers upside down on the VOR compass rose (as in other systems).

If the airplane course is "TO" VOR station, set the reciprocal radial bearing card indexed directly over the VOR compass rose magnetic north line.

On a long flight, when the chart is folded correctly, the plotter board is turned over to the other side and tracking of the airplane's course continues.

The fine alignment bearing scale are marked every 1° on the plotter for accuracy.

While I have described my invention with particular reference to the drawings, such is not to be considered as limiting its actual scope.

Having thus described this invention, what is asserted as new is:

1. In an inflight plotting apparatus including a plotting board structure carrying a removable navigational map, a plotting device comprising:

a transparent flat circular plastic compass rose having a central opening;

a flat elongated transparent plastic rectangular first member having one end integral with a portion of the periphery of said rose, said rose and said first member lying in a common plane, said first member having a longitudinal slot extending from a position adjacent the other end of said first member to said one end of the first member, said first member having a linear scale disposed along the slot;

a transparent flat doughnut shaped second member secured to the top surface of the rose, said second member having an opening aligned with the central opening of said rose;

a transparent cap secured to the top surface of the second member and having a central hole centered on the aligned openings;

a bushing disposed at the center of the openings and hole and extending at right angles to said common plane, one end of said bushing extending through said hole;

lifting ring means secured to said one end of the bushing; and a suction cup disposed outside of the opening in the rose and secured to the other end of the bushing.

2. Apparatus of claim 1 wherein said means includes a lifting ring, a leaf spring tension washer and a locknut.

3. Apparatus of claim 2 having two of said devices.

4. Apparatus of claim 3 wherein the board structure includes two flat rectangular transparent boards hingedly secured together, said map being disposed between said boards.

* * * * *